Dec. 6, 1938.  E. L. BURNETT  2,139,257
CENTERING DEVICE FOR TYPEWRITING MACHINES
Filed Nov. 25, 1936
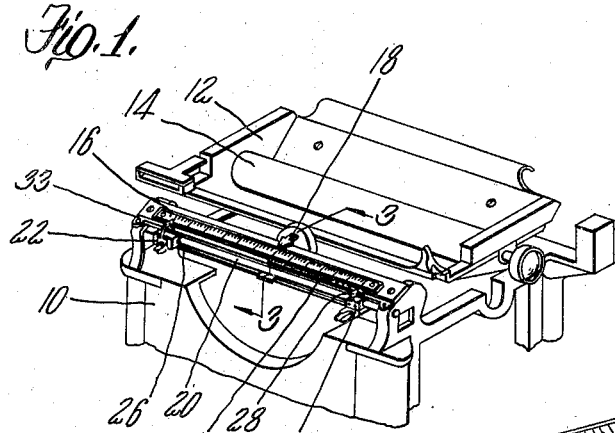
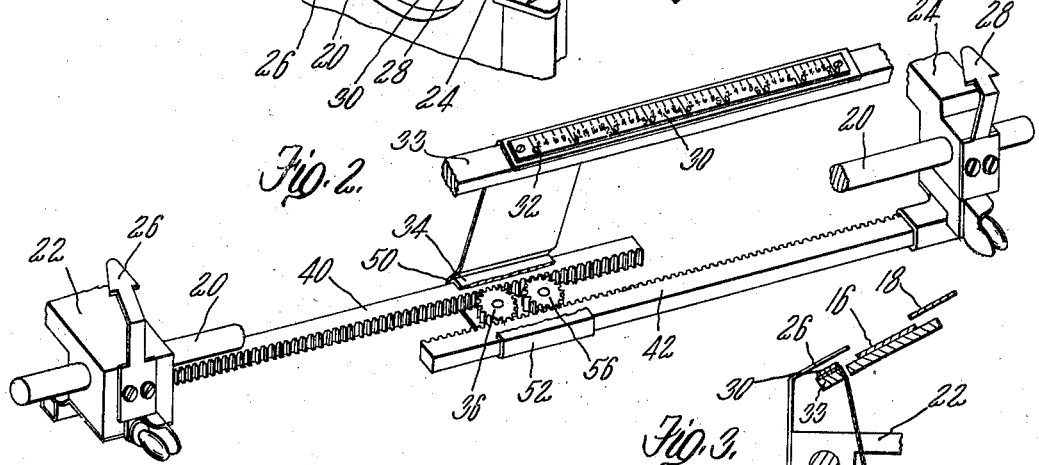
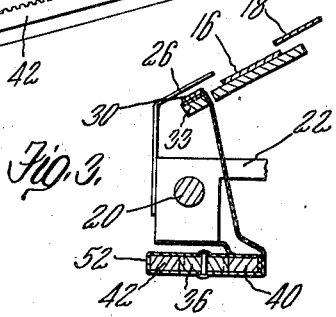
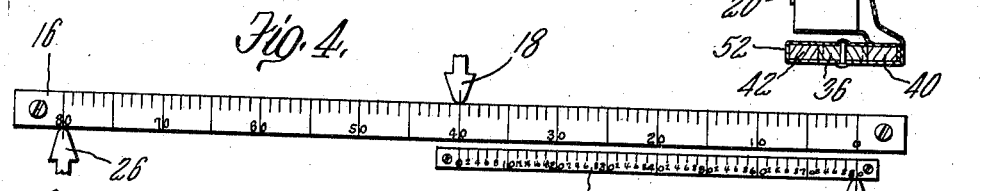
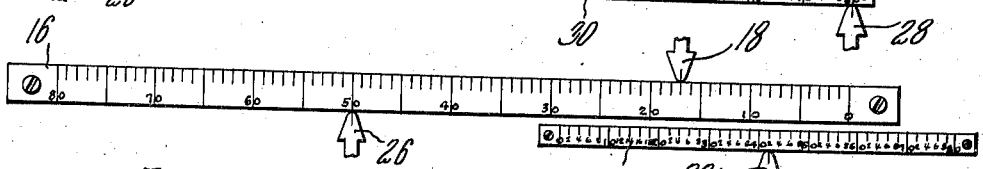
Inventor
Elizabeth L. Burnett
by Wright, Brown, Quinby & May
Attys Patented Dec. 6, 1938

2,139,257

UNITED STATES PATENT OFFICE 2,139,257

CENTERING DEVICE FOR TYPEWRITING MACHINES

Elizabeth L. Burnett, Boston, Mass.

Application November 25, 1936, Serial No. 112,729

1 Claim. (Cl. 197—187)

This invention relates to a centering device for a typewriting machine and more particularly to a device for centering headlines or the like on the paper in a machine, regardless of the width or position of the paper in the machine.

It is an object of the invention to provide means for centering headlines and the like which will obviate the necessity of calculations of any kind other than the counting of the numbers of letters and spaces in the line to be typed.

It is a further object of the invention to provide a device which can be used for centering headlines and the like on paper which is either centered in the machine or is offset in either direction.

The invention may be embodied in mechanism by which the marginal stops which are provided with certain makes of typewriting machines as standard equipment, maintain midway between them the zero point of an auxiliary scale, this scale being mounted on a special carriage so as to be longitudinally movable therewith. The stops are connected to the scale carriage by connecting means such that the zero point of the scale is always midway between stops no matter what the position of the individual stops may be.

For a more complete understanding of the invention, reference may be had to the description of an embodiment thereof which follows and to the drawing of which Figure 1 is a perspective view of parts of the upper portion of a typewriting machine on which an embodiment of the invention is mounted.

Figure 2 is a perspective view of a centering device embodying the invention.

Figure 3 is a section on the line 3—3 of Figure 1.

Figure 4 is a diagrammatic view of the front scale and auxiliary scale of the typewriting machine, the various index elements which cooperate with these scales being indicated.

Figure 5 is a similar view showing the various elements in different positions.

The invention is illustrated in Figure 1 as applied to a standard make of typewriting machine having a main frame 10 on which is slidably mounted the usual carriage 12 with the cylinder or platen 14 journaled therein. On the main frame is mounted the customary front scale 16 over which moves an index element 18 for the purpose of indicating the position of the carriage relative to the striking point of the type. Mounted on the main frame 10 below the front scale 16 is a rod 20 on which are slidably mounted a pair of marginal stops 22 and 24. These stops have index elements 26 and 28 respectively which preferably overlap the front scale 16 so as to indicate the location of the margins within which the carriage 12 travels without hindrance. The marginal stops 22 and 24 are provided with pawls which engage stationary racks mounted on the frame 10, these racks and pawls not being shown as they are standard equipment for typewriting machines of this kind. These racks and pawls releasably maintain the respective stops in any positions to which they are adjusted. The members of the machine thus far mentioned are all standard equipment.

According to the present invention, I attach to the stops 22 and 24 a centering device which comprises an auxiliary scale 30, the zero point 32 of which is maintained constantly midway between the stops 22 and 24. The scale 30 slides on and is supported by a bar 33 which is mounted on the frame 10 of the machine. The scale 30 is secured to a carriage 34 which travels therewith and on which is journaled a pinion 36 meshing with a pair of racks 40 and 42 which are arranged parallel to the rod 20. The racks 40 and 42 are secured respectively to the stops 22 and 24, so that when either of these stops is adjustably slid along the rod 20, the corresponding rack moves longitudinally therewith. Since the pinion 36 is constantly meshed with both of these racks, longitudinal movement of either rack will cause the pinion to roll along the other rack, the advancing movement of the pinion, and hence of the carriage 34, being half that of the moving rack. Hence, if the carriage 34 is initially arranged so that the zero point of the scale 30 is midway between the stops 22 and 24, it is evident that, no matter which stop is adjustably shifted, the zero point 32 will always remain midway between the two stops. In order to maintain the pinion 36 constantly in mesh with both racks, the carriage 34 may be provided with guiding portions 50 and 52 which engage the mutually remote edges of the racks 40 and 42 and prevent spreading of the racks away from the pinion 36. If desired, a second pinion 56 may be journaled on the carriage 34 beside the pinion 36, both pinions being always in mesh with both racks. The second pinion adds to the stability of the device as a whole but does not change its essential functioning in any way.

The spacing of scale markings of the auxiliary scale 30 is similar to that of the scale divisions on the front scale 16, but the numbering is such that each scale mark of the auxiliary scale is equivalent to two spaces of the front scale, as is evident from a comparison of the scales shown in Figures 4 and 5. In the embodiment of the invention illustrated, the auxiliary scale extends toward the right from its zero point and has half as many scale divisions as has the front scale 16. Since, however, each scale division counts 2, the numbering on the auxiliary scale 30 totals the same as the numbering on the front scale 16. Figure 4 shows the position of the scale and index elements when the marginal stops are at their extreme positions for a sheet of paper of maximum width, the carriage 12 being centered. Since the zero point of the auxiliary scale 30 is always midway between the marginal elements 26 and 28, the zero point of the scale 30 is in such case alined with the midpoint of the scale 16. In the scales illustrated in Figures 4 and 5, 80 scale divisions are shown, but it is obvious that the mechanism would operate in the same manner with scales of a greater or lesser number of scale divisions.

In using the centering device illustrated, a piece of paper is inserted in the machine. If it is desired to center a title or other line of typing with respect to the side edges of the paper, the marginal stops are adjusted so that the index elements 26 and 28 are alined with the side edges of the paper. Thus it makes no difference whether the paper itself is centered in the machine with respect to the carriage 12 or is offset to one side or the other. When the marginal stops have been adjusted to alinement with the edges of the paper, the zero point of the auxiliary scale 30 will always be exactly centered with reference to the paper itself since the rack and pinion device always maintains the zero point of the scale midway between the marginal stops 22 and 24. Figure 5 illustrates, by way of example, the index elements 26 and 28 adjusted to the 50th and 8th scale divisions, respectively, on the front scale 16. If it is desired to type a heading of 24 letters and spaces, the carriage 12 is moved to bring the index element 18 in line with the scale division "24" on the auxiliary scale 30, as indicated in Figure 5. The machine is then ready for typing, and, if a heading of 24 letters and spaces is then typed, such heading will be exactly centered between the divisions 50 and 8 of the front scale of the machine. Thus the only thing necessary to calculate is the actual number of letters and spaces in the line to be typed. No further calculation is necessary, the index element 18 being merely set opposite that number as it appears on the auxiliary scale 30.

It is evident that the marginal stops need not be adjusted to alinement with the edges of a sheet of paper in the machine. It is sometimes desired to center a number of lines of typing with relation to a vertical line offset from the center of the sheet. This can easily be accomplished by a suitable initial setting of the marginal stops.

While the invention has been illustrated as applied to adjustable margin stops mounted on the stationary frame of the machine, it is evident that the invention may also be embodied in similar mechanism which is mounted on the carriage of the machine, some makes of machines being made with the front scale mounted on the carriage rather than upon the frame itself.

It is to be understood that the invention is not to be specifically limited to the particular embodiment herein shown and described but is to be as broadly construed as is consistent with the scope defined in the following claim.

I claim:—

A centering device for a typewriting machine having a frame and a rod and a bar mounted on said frame, said device comprising an auxiliary scale freely slidable on said bar, a pair of index members slidably adjustable along said rod, a carriage depending from and supported by said auxiliary scale, a pinion rotatably mounted on said carriage, and a pair of racks meshing with said pinion and secured respectively to said index members.

ELIZABETH L. BURNETT.